(No Model.)
W. J. HOSACK.
Garden Implements.
No. 228,638.    Patented June 8, 1880.
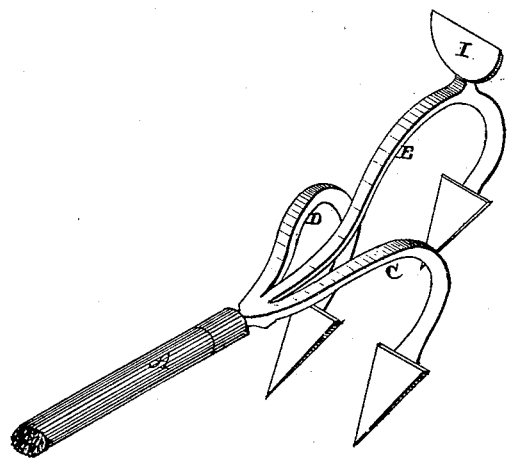
Witnesses—
W. W. Mortimer.
C. Henry Upham.
Inventor—
W. J. Hosack,
per
F. A. Lehmann,
Atty.

United States Patent Office.

WILLIAM J. HOSACK, OF NORTHWOOD, OHIO.

GARDEN IMPLEMENT.

SPECIFICATION forming part of Letters Patent No. 228,638, dated June 8, 1880.

Application filed April 7, 1880. (No model.)

*To all whom it may concern:*

Be it known that I, WILLIAM J. HOSACK, of Northwood, in the county of Logan and State of Ohio, have invented certain new and useful Improvements in Garden Implements; and I do hereby declare the following to be a full, clear, and exact description of the invention, such as will enable others skilled in the art to which it pertains to make and use it, reference being had to the accompanying drawing, which forms part of this specification.

My invention relates to an improvement in garden implements; and it consists in forming three separate and distinct prongs, each one of which is provided with a suitably-shaped hoe for breaking the surface of the ground, and securing to the top of the central one of these prongs a suitable cutting-hoe for cutting off vines and other such plants, as will be more fully described hereinafter.

The accompanying drawing represents a perspective of my invention.

A represents an ordinary handle, of any desired length, and which has the three prongs C D E secured in its lower end. These three prongs may be united at their ends where they are secured in the handle, or each one may be kept separate and distinct from the others, so that in case one of the prongs should happen to be broken it can be removed and replaced by another. The two prongs C D are made of the same shape and size, while the third one, E, is made much longer and is curved up to a considerable height above the top of the other two. The lower end of each of these prongs is provided with a suitably-shaped shovel for breaking the surface of the ground, and these shovels are placed in such relation to each other that when the handle is held in the usual position all three of the points of the shovels will bear evenly on the ground.

Upon the back of the prong E, at the point where it is raised the highest above the two other prongs, is secured a cutting-blade or hoe, I, which, when the implement is turned over, can be used for cutting off vines, weeds, and other such plants.

The three prongs being placed in the relation to each other as shown, and provided with shovels, serve to break and loosen the ground around the growing plants; but whenever vines or weeds of any kind have to be cut off or dug up the implement is turned over and the hoe I is brought into play.

I am aware that a garden implement consisting of three prongs, one of which is curved upward above the others, is old.

I am also aware that garden implements of various kinds having a cutting device or hoe on the back are not new, and I therefore limit my claim to the construction here shown.

Having thus described my invention, I claim—

A garden-tool composed of the handle A, the two short prongs C D, and the long central prong, E, having a hoe, I, secured to its back, the prong E being curved upward in between the other two, substantially as shown.

In testimony that I claim the foregoing I have hereunto set my hand this 30th day of March, 1880.

WILLIAM JAMES HOSACK.

Witnesses:
  S. G. CONNER,
  WILLIAM IRWIN BROOKS.